United States Patent [19]

Hammond

[11] 4,373,057
[45] Feb. 8, 1983

[54] PROCESS FOR MAKING CURABLE ADHESIVE POLYURETHANE PRODUCTS

[75] Inventor: James A. Hammond, Redlands, Calif.

[73] Assignee: Colamco, Inc., Columbus, Ohio

[21] Appl. No.: 301,838

[22] Filed: Sep. 14, 1981

[51] Int. Cl.$^3$ .................... C07C 79/46; C08G 18/08; C08K 5/09

[52] U.S. Cl. ................................ 524/700; 524/712; 524/714; 524/730; 524/773; 528/51; 528/52; 528/59; 528/77; 560/23

[58] Field of Search .................. 528/51, 52, 59, 77; 260/31.8 R; 560/26; 521/901, 906, 902; 524/700, 712, 714, 730, 773

[56] References Cited

U.S. PATENT DOCUMENTS

| | | |
|---|---|---|
| 3,351,573 | 11/1967 | Skreckoski ............................ 260/18 |
| 3,639,355 | 2/1972 | Wooster ...................... 260/77.5 AP |
| 3,734,896 | 5/1973 | Patton ................................. 528/51 |
| 3,933,725 | 1/1976 | Dearlove et al. ..................... 528/51 |
| 3,980,594 | 9/1976 | Fabris et al. ......................... 528/52 |
| 4,040,992 | 8/1977 | Bechara et al. ..................... 521/902 |
| 4,145,515 | 3/1979 | Pogozelski et al. .................. 528/77 |
| 4,169,175 | 9/1979 | Marans et al. ....................... 528/59 |
| 4,182,898 | 1/1980 | Fujiwara et al. ..................... 560/26 |
| 4,261,852 | 4/1981 | Carroll et al. ........................ 528/59 |

OTHER PUBLICATIONS

Saunders et al., Polyurethanes, Part II, Interscience, N.Y., (1964), pp. 38-43.

*Primary Examiner*—H. S. Cockeram
*Attorney, Agent, or Firm*—Blakely, Sokoloff, Taylor & Zafman

[57] ABSTRACT

This invention is directed to a polyurethane product produced by a one step process, in the absence of a polymerization catalyst, with reactants, and additives, if any, being initially intermingled in the ambient room temperature range and reacted with intermingling in the absence of externally added heat. The reactants are (1) aliphatic, aromatic, or cycloaliphatic having at least two isocyanate groups and (2) diol/polyol compounds having at least two sterically unhindered hydroxyl groups. The product is a liquid, homogeneous adhesive material characterized by a natural absence of polymerization catalyst residue and capable of being cured because of the presence of unreacted isocyanate groups, the isocyanate reactant being charged in excess of the stoichiometric requirement of the diol/polyol reactant.

20 Claims, No Drawings

PROCESS FOR MAKING CURABLE ADHESIVE POLYURETHANE PRODUCTS

BACKGROUND OF THE INVENTION

1. Field of the Invention

This invention relates to polyurethane products, naturally free of polymerization catalyst residues. Particularly the invention relates to a process for producing polyurethanes without the use of polymerization catalyst at initial processing temperature in the ambient room temperature range.

2. Description of the Prior Art

Conventionally the reaction of organic "di or poly" isocyanates with organic "di or poly" hydric alcohols to produce polyurethane product is carried out with the help (in the presence of) a polymerization catalyst, or at an elevated, superatmospheric, temperature to initiate the polymerization reaction which then carries on aided by the exothermic heating. Both reaction aids may be used in some cases. Organic catalyst tends to take part in the reaction affecting the polymer product properties; or decomposes to introduce, frequently, color problems into the polymer product. Metal catalyst, especially the tin catalysts, affect the polymer product quality; tin residues make the product humidity sensitive, as well as adversely affecting other properties. In long term usage, such as in furniture usage, catalyst residues may cause degradation particularly in color changes, and decreasing the toughness of the product. Reaction at higher elevated temperatures tends to impair properties of the polyurethance product by causing adverse secondary reactions.

OBJECTS OF THE INVENTION

An object of this invention is a polyurethane material characterized by a natural absence of polymerization catalyst residue or byproducts.

Another object of this invention is a urethane polymerization process operating in the absence of polymerization catalyst, beginning the reaction in the ambient room temperature range and carrying out the reaction in the absence of externally added heat.

Still another object is a homogeneous polyurethane material with adhesive properties, capable of being cured to provide adhesive bonding for a composite article (artifact), either planar or 3-D.

Other objects of the invention will be apparent from the following description.

SUMMARY OF THE INVENTION

One aspect of this invention is directed to a polyurethane material (product), characterized by a natural absence of polymerization catalyst residue, of the reaction of isocyanate compound(s) selected from the class consisting of aliphatic, aromatic, and cycloaliphatic isocyanates having at least two isocyanate groups, and diol/polyol compound(s), preferably those selected from the class consisting of aliphatic diols, aliphatic polyols, cycloaliphatic diols, cycloaliphatic polyols, aromatic diols, and aromatic polyols, diol/polyol having at least two sterically unhindered hydroxyl groups. Illustrative defined isocyanates are: toluene diisocyanate; 4,4'-diphenylmethane diisocyanate; hexamethylene diisocyanate; and methylcyclohexylene diisocyanate. Illustrative diol/polyols are: poly(oxyethylene)-diol having a molecular weight (MW) up to about 700; poly(oxypropylene) diol having a MW up to about 2000; poly(oxyalkylene) adduct of a hydrocarbon polyol having 3–11 hydroxyl groups, where alkylene has 2–4 carbon atoms; poly(oxyalkylene) adduct of alkylene diamine where the adduct has at least two terminal hydroxyl groups, and each alkylene has 2–4 carbon atoms and each amine-alkylene has at least 2 carbon atoms. The homogeneous product may include additives, such as, plasticizer and fire retardant.

Another aspect of this invention is a polyurethane product, characterized by a natural absence of polymerization catalyst residue, which product is formed by a one step process consisting essentially of: (1) the reaction of (a) isocyanate compound(s) selected from the class consisting of aliphatic, aromatic, and cycloaliphatic isocyanates having at least two isocyanate groups, and (b) diol/polyol compounds, preferably selected from the class consisting of aliphatic diols, aliphatic polyols, cycloaliphatic diols, cycloaliphatic polyols, aromatic diols, and aromatic polyols, each diol/polyol having at least two sterically unhindered hydroxyl groups, and (c) said reactants (1a and 1b) being simultaneously present in a stoichiometric excess of said isocyanate groups of about 1–25%; (3a) said reactants being initially intermingled in the ambient room temperature range; and (3b) then reacted by intermingling in the absence of externally added heat. Said ambient room temperature normally falls in the range of about 65°–86° F. (18.3°–30.0° C.); but may be a few degrees variant depending on the climate. Reaction time at normal ambient room temperature is usually up to about 2 hours but will vary with temperature and particular reactants. Desirably the stoichiometric excess is about 10–20%. Additives, such as, plasticizer and fire retardant, may be present in the reaction and become part of the product.

DESCRIPTION

The product of the invention may be further reacted to form elastomers, coatings, fibers, potting materials or adhesives, such as, are produced by conventional polyurethane processes.

The organic isocyanate compound reactant is selected from the class consisting of aliphatic (desirably alkylene), aromatic, and cycloaliphatic isocyanates, each compound having at least two isocyanate groups. Illustrative isocyanate compounds are: AROMATIC: toluene diisocyanate, that is, 2,4-toluene diisocyanate (TDI), 2,6-toluene diisocyanate, and mixtures thereof, such as, 80/20 and 65/35 of the 2,4/2,6 isomers. meta-Pheneylene diisocyanate. 4,4'-diphenylmethane diisocyanate (MDI). Polyisocyanates derived from the phosgenation of polyamines, such as, from the reaction of aniline and formaldehyde. ALIPHATIC AND CYCLOALIPHATIC: hexamethylene diisocyanate. "dimeryl" diisocyanate, which has a 36 carbon atom alkylene group. methylcyclohexylene diisocyanate. methylenedicyclohexyl diisocyanate.

Any compound having two hydroxyl groups (diol) or at least three hydroxyl groups (polyol)—hereinafter referred to as diol/polyol—may be used in the reaction, it being understood that each diol/polyol compound has at least two sterically unhindered hydroxyl groups. It is preferred that the diol/polyol reactant is selected from the class consisting of aliphatic diols, aliphatic polyols, cycloaliphatic diols, cycloaliphatic polyols, aromatic diols and aromatic polyols, each diol/polyol having at least two sterically unhindered hydroxyl groups. This preferred diol/polyol class is sometimes referred to as "organic-ols".

The aliphatic-ols include the simple glycols, such as, ethylene glycol, propylene glycol, butylene glycol, hexandiol and octanediol. The simple ether glycols, such as, diethylene glycol, triethylene glycol, dipropylene glycol, tripropylene glycol. The simple (hydrocarbon) triols, such as, glycerol, 1,1,1-trimethylol propane, 1,2,6-hexane triol. The simple tetrols, such as, pentaerythritol. The condensed polymers, copolymers, and block copolymers of alkylene oxides having 2-4 carbon atoms in alkylene, such as, the condensed polymers of ethylene oxide and/or propylene oxide and/or butylene oxide, including block copolymers. Illustrative of these are poly(ethylene)diols, desirably up to 700 MW; poly(propylene) diols, desirably up to 2000 MW; poly(ethylene/propylene) diols; and poly(ethylene-b-propylene) diol block copolymers. Especially suitable are the poly(oxyalkylene) adducts of the aliphatic polyols, particularly the hydrocarbon polyols having 3-11 hydroxyl groups, such as, glycerol, trimethylol propane, 1,2,6-hexanetriol, pentaerythritol, sorbitol (6OH), mannitol (6OH), and sucrose (11OH). where alkylene has 2-4 carbon atoms. Cycloaliphatic diols/polyols are illustrated by 1,2- and 1,4- isomers of cyclohexanediol and by 1,6-cyclodecanediol. Anhydroenneaheptitol has 5 OH groups. 1,3,4,5-cyclohexanetetrol has 4 OH groups. Cyclohexanhexol has 6 OH groups. Of interest is poly(oxytetramethylene) glycol.

The reaction system may use as the diol/polyol reactant (or one of them) an aromatic alcohol as defined in hydroxyl group content. An illustrative aromatic diol is 1-phenyl-1,3-propanediol. Union Carbide Corporation BE 375 is a mixture of aromatic polyols.

In addition to the aforesaid defined organic-ols, useful products can be made from diol/polyol reactants of any species, exemplified by silicone-ols and fluorocarbon-ols.

Another broad class of aliphatic diol/polyols is provided by the saturated polyesters having terminal hydroxyl groups. These may be formed by reaction of dicarboxylic acids, such as, adipic acid, succinic acid and phthalic anhydride with the defined diol/polyols.

The diol/polyol reactant is broadly below about 6000 MW and generally has 2-11 hydroxyl groups, as defined.

The two sterically unhindered hydroxyl groups need not be terminal groups. However, it is preferred that at least two hydroxyl groups be terminal groups.

The reactivity of the defined diol/polyol is affected by the position of the primary hydroxyl group(s) present, the type of molecule and the size of the molecule. This is especially true of adducts where the parent of the final diol/polyol compound has a noticeable influence on reactivity. A particularly reactive polyol for this invention is derived by the adduction of poly(oxyalkylene)diol, where each alkylene has 2-4 carbon atoms, to alkylene diamine, where each amine-alkylene has at least 2 carbon atoms. Ethylene diamine adducted to provide four terminal poly(oxypropylene) "OHs" is of especial interest.

Herein the reactants are charged in molar proportions based on isocyanate or hydroxyl groups present such that some excess of isocyanate groups, over hydroxyl groups, is present, that is "isocyanate groups"-/hydroxyl groups is greater than 1. Conventionally the excess is referred to as a percentage based on the stoichiometric requirement. Herein, the excess of isocyanate groups present over hydroxyl groups present is broadly in the range of about 1-25%. Desirably, the excess is in the range of 5-25%. For a strongly adhesive product about a 20% excess is preferred. For a flexible elastomeric product, about a 10% excess is preferred. Therefore the preferred range of isocyanate groups to hydroxyl groups is about 10-20% (this may be spoken of as a ratio of isocyanate groups/hydroxyl groups of about 1.10-1.20.)

It is to be understood that the urethane reaction of this invention proceeds in the absence of any polymerization catalyst—spoken of herein as a natural absence of polymerization catalyst. Therefore, the polymer product of the process of the invention is characterized by a natural absence of polymerization catalyst residue. The absence of such catalyst eliminates the need for sampling during the reaction to determine whether the first catalyst addition, and usually, subsequent addition(s) has been adequate.

In the process of the invention the desired quantity of the isocyanate reactant and the desired amount of the "ol" reactant is added to the reaction zone at one time. Thus the total isocyanate reactant and the total "ol" reactant are simultaneously present in the reaction zone (reactor) at the practical initiation time of the urethane reaction.

All the material components needed for the preparation of the particular polyurethane product are present in the reaction zone at the initiation time, that is, the isocyanate reactant, the "ol" reactant, additives, if any, are added in toto to the reaction zone. The process of this invention may be described as a "one step" process. Additives as used herein include: plasticizers, tackifiers, extenders, fillers, pigments and the other materials considered by this art.

The instant reaction may be, in a large scale operation, carried out in a continuous operation. However, the instant reaction is especially adapted to batch operations, as the reaction easily accomodates to reactors of a half liter size to 55 gallon (USA) drums, or larger. This is conveniently carried out in a closed vessel by means of a drum roller. In an open vessel a propellor stirrer is effective.

The components of the reaction system are added to the reaction zone and intermingled initially while in the ambient room temperature range, which is generally in the range of about 65°-86° F. (18.3°-30.0° C.).

The reaction is mildly exothermic, which raises the reactor temperature, but not substantially. Thus a large drum reactor will attain a maximum temperature, which can be described as "hand-warm" when the exterior of the metal drum is touched. Thus the reaction is carried out with intermingling in the absence of externally added heat.

No rigid time scheduling of the reaction system is necessary. Typically a 55 gal. drum reactor, with a drum roller for intermingling, starting at about 74° F. (23.3° C.) will substantially complete the polymerization reaction in about 2 hours. Smaller batches and/or with more efficient stiring will have shorter reaction times.

It is to be understood that the conventional maintaining of the urethane reaction zone initially in an essentially anhydrous condition also applies to the instant process.

The polyurethane product of this process is typically a homogeneous, non-separating liquid or semi-solid liquid with adhesive properties; the viscosity is dependent on the particular reactants, the excess isocyanate, the plasticizer and/or other additives present.

Soft adhesive products generally result from reaction of high MW "ol" reactants having 2-3 OH groups, with isocyanates having 3 or more NCO groups. In general, the higher the "ol" MW, the softer and more flexible the adhesive bond afforded by the cured product of the invention. Hard adhesive products generally result from the reaction of low MW "ol" reactant or polyols having 4-8 OH groups. The softness (or hardness) of the adhesive bond can be modified to a degree by the presence of plasticizer in the product.

The adhesive products can on curing bond vinyl plastic, natural or synthetic textiles to substrates such as, foamed plastic, paper, aluminum foil or plate, cardboard, corrugated boxboard, fiberglas reinforced plastic material, wood, and leather. The adhesive may be processed to provide an ultimate object having a foamed adhesive bond, flexible or rigid.

EXAMPLES OF PRODUCTS OF THE INVENTION

In the following examples of products capable of being made by the process of the invention, weight percent proportions of the specified materials, reactants and, if any, additives, were added to a drum reactor at ambient room temperature of about 74°-80° F., were intermingled using a drum roller until a homogeneous liquid product was obtained. All reactions were mildly exothermic as evidenced by warmth to the touch. The excess of isocyanate groups present at the start of the reaction for example is given, e.g., "(10% NCO)".

The various components which need definition are: (Each component, which is not a standard chemical name, is a trademark appellation.)

| ORGANIC-OLS | |
|---|---|
| A. From Union Carbide Corporation | |
| NIAX 11-34 | polyether triol about 5000 MW. |
| PPG 2025 | polyether diol about 2000 MW. |
| PPG 1025 | polyether diol about 1000 MW. |
| PPG 425 | polyether diol about 400 MW. |
| HDM 361 | Polyol based on sucrose about 1200 MW. |
| LS 490 | Polyol based on sorbitol about 700 MW. |
| BE 375 | Polyol based on aromatic ring compounds. |
| B. From BASF Wyandotte | |
| Pluracol P494 | Polymeric tetrol based on ethylene diamine, about 4800 MW. |
| Quadrol | Polymeric tetrol based on ethylene diamine, about 292 MW. |
| C. From Mobay Chemical | |
| Multranol 3901 | Polyether triol, about 6000 MW. |
| D. From E.R. Carpenter Company | |
| GP 700 | Polyether triol about 700 MW. |
| ISOCYANATES | |
| E. From Upjohn | |
| PAPI | Crude polymeric 4,4'-methylenediphenyl diisocyanate (MDI) On the average, this has about 2.7 NCO groups |
| PAPI 27 | Somewhat refined PAPI, having about 2.6 NCO groups per molecule. |
| PAPI 20 | Polymeric PAPI having 3 or more NCO groups per molecule. |
| Isonate 143L | A low viscosity liquid mixture of substantially pure MDI and its trimer, with an average of about 2.3 NCO groups per molecule. |
| F. From Mobay | |
| Mondur MR | Crude polymeric MDI, very similiar to PAPI. |
| G. From Union Carbide | |
| TDI | Toluene diisocyanate mixture of the 2,4- and 2,6-isomers in the 80/20 proportion. |
| ADDITIVES which may be present in the reaction system. | |
| H. From Stauffer Chemical | |
| Fyrol CEF | Tris(beta chloroethyl)phosphate fire retardant. |
| I. From Velsicol Chemicals | |
| Benzoyl Chloride (BzCl) | A strong Lewis acid used to retard reaction of urethane prepolymer and isocyanate with moisture. |
| J. From Harwick Chemicals | |
| DOP | Dioctyl phthalate: a low viscosity plasticizer. |
| Califlux LP | A low viscosity, high aromatic content oil plasticizer. |
| Bearflex LPO | a more refined version of Califlux LP. |
| K. From Union Carbide | |
| L 5340 | A non-hydrolyzable silicone surfactant described in U.S. Pat. Nos. 2,834,748 and 2,917,480. |
| L. From Air Products Co. | |
| DABCO TAC | hydroxyalkyl quaternary ammonium carboxylate described in U.S. Pat. No. 4,040,992. This is a delayed action cure catalyst which becomes operative at elevated temperature well above ambient atmospheric temperature. |
| M. From BASF Wyandotte | |
| Quadrol | N,N,N',N',-tetrakis(2-hydroxypropyl)ethylene diamine. Used as a cross-linking agent to modify adhesive hardness and strength. |
| N. From Air Products | |
| DABCO | Triethylene diamine. |

EXAMPLES
of adhesive liquid and semi-liquid, homogeneous polyurethane products curable to soft elastomers and/or adhesive bonds - foamed or unfoamed.

| Example | Component | Parts by Weight | Isocyanate % Excess |
|---|---|---|---|
| 1. (185KTS-UV) | Multranol 3901 | 100. | |
| | DOP | 100. | |
| | Isonate 143L | 113.9 | 10. |

This example gives a light colored adhesive for use with color sensitive materials.

| | | | |
|---|---|---|---|
| 2. (556B) | Multranol 3901 | 100. | |
| | DOP | 100. | |
| | Mondur MR | 134. | 10. |
| | BzCl | 0.5 | |

This example gives a product darker than example No. 1 because a less expensive isocyanate reactant is used; the cured material is also darker than the cured product of example No. 1.

| | | | |
|---|---|---|---|
| 3. (556A) | Multranol 3901 | 100. | |
| | Mondur MR | 72. | 10. |
| | BzCl | 0.5 | |
| 4. (185KTS-QM) | Multranol 3901 | 100. | |
| | Califlux LP | 100. | |
| | Mondur MR | 90. | 10. |
| | BzCl | 0.32 | |
| 5. (462B) | NIAX 11-34 | 100. | |
| | Fyrol CEF | 20. | |
| | Isonate 143L | 67.4 | 10. |

The cured product of this example is a light colored material with fire retardant properties.

| | | | |
|---|---|---|---|
| 6. (137D) | PPG 2025 | 100. | |
| | Fryol CEF | 40. | |
| | Bearflex LPO | 100. | |
| | PAPI | 157.8 | 11.5 |
| 7. (202B) | PPG 2025 | 100. | |
| | Bearflex LPO | 200. | |
| | Mondur MR | 300. | 15. |

This example illustrates high excess isocyanate usage as well as high plasticizer usage.

EXAMPLES
of adhesive liquid and semi-liquid, homogeneous polyurethane product curable to "rigid" material and/or "rigid" adhesive bonds - foamed or unfoamed.

| Example | Component | Parts by Weight | Isocyanate % Excess |
|---|---|---|---|
| 8. (196C) | Pluracol P494 | 100. | |
| | Fyrol CEF | 30. | |
| | Bearflex LPO | 100. | |
| | Mondur MR | 157.3 | 11.5 |
| 9. (106A) | PPG 425 | 100. | |
| | Fyrol CEF | 40. | |
| | TDI | 57.2 | |
| | PAPI | 155. | 16. |
| | BzCl | 0.5 | |
| | Quadrol | 0.28 | |

This example illustrates the use of a mixture of isocyanates and also the use of a cross linker (Quadrol).

| | | | |
|---|---|---|---|
| 10. (340C) | GP 700 | 100. | |
| | BE 375 | 6.2 | |
| | Fyrol CEF | 100. | |
| | Mondur MR | 544.8 | 20. |
| | BzCl | 0.5 | |
| | Quadrol | 3.0 | |

This example illustrates the use of a mixture of aliphatic polyols and an aromatic polyol (BE 375) along with a cross linker (Quadrol).

| | | | |
|---|---|---|---|
| 11. (283C) | LS 490 | 100. | |
| | Fyrol CEF | 50. | |
| | Bearflex LPO | 100. | |
| | Mondur MR | 749.1 | 20. |
| | BzCl | 1.0 | |

This example illustrates the use of a sorbitol based polyol.

| | | | |
|---|---|---|---|
| 12. (334C) | HDM 361 | 100. | |
| | Fyrol CEF | 60. | |

-continued
EXAMPLES
of adhesive liquid and semi-liquid, homogeneous polyurethane product curable to "rigid" material and/or "rigid" adhesive bonds - foamed or unfoamed.

| Example | Component | Parts by Weight | Isocyanate % Excess |
|---|---|---|---|
| | Bearflex LPO | 100. | |
| | Mondur MR | 685.3 | 20. |

This example illustrates the use of a sucrose based polyol.

| | | | |
|---|---|---|---|
| 13. (213A) | PPG 1025 | 100. | |
| | Fyrol CEF | 30. | |
| | PAPI | 107. | 10% |

This example illustrates the use of a low MW polyol and lower excess isocyanate.

CURE PROCEDURES

Elastomeric articles, "rigid" articles, and other solid polyurethane articles, including 3-D articles, are prepared by heating the appropiate liquid or semi-liquid product of the invention to a cure temperature in the presence of a cure catalyst for the necessary time, as would be done with a prior art curable polyurethane material.

A major proportion of uses for cured polyurethane articles, including flat and 3-D articles, involve foamed articles, both unitary and composite, or foamed portions of composite articles. One form of composite article can be made by applying to a substrate, which may be a wet plastic foam or a wet textile, a layer of adhesive which may contain an internal cure catalyst or be coated with a catalyst, and then heating the composite to a steam cure temperature to obtain an adhesive bonded foamed composite article.

In a variation: The composite article is made by using a dry substrate and the product adhesive coating is wet with water to obtain, on curing, a foamed coated portion bonded to the substrate.

In another variation: The composite article is made by using both a dry substrate and a dry adhesive product coating; the composite is then cured in a steam atmosphere with the result that, at least the product coating becomes a cured foam.

It is to be understood that the cure conditions for the product of the invention follow the well known prior art conditions for curing various polyurethane materials. In general the cure may be at ambient temperature requiring a prolonged time of as much as 48 hours, or a shorter time at elevated temperature; catalyst usage also affects the cure time. To illustrate: a relatively thin adhesive coating cures in about 45 seconds at about 250° F. (121.1° C.); the same coating requires about 2 minutes at 180° F. (82.2° C.); and the same coating requires about 4 minutes at about 150° F. (65.6° C.). Catalysts lower cure temperature at a set time or decrease cure time at a set temperature. Delayed action catalysts are available, which do not begin to accelerate the cure action until the material has reached an elevated temperature which trigger the cure action, thus permitting the handling of "warm" material without having the disadvantage of some curing going on and also permitting a more precise control of the cure reaction itself.

The modest temperature requirements of the process of the invention give the processor the option of adding the delayed action cure catalyst to the product of the process or of adding the delayed action catalyst to the reaction system itself as the delayed action catalyst rides along unchanged, as it is not triggered at these low temperatures.

EXAMPLES
of Products of the Invention
which include a delayed action
cure catalyst.

| Example | Component | Parts by Weight | Isocyanate % Excess |
|---|---|---|---|
| 14. (653A) | Multranol 3901 | 100. | |
| | Fyrol CEF | 30. | |
| | DOP | 100. | |
| | L5340 | 3.5 | |
| | Mondur MR | 118.6 | 10. |
| | BzCl | 0.3 | |
| | DABCO TAC (delayed action) catalyst) | 1.0 | |
| 15. (653B) | Multranol 3901 | 100. | |
| | DOP | 100. | |
| | L5340 | 3.3 | |
| | Mondur MR | 104.8 | 10. |
| | BzCl | 0.3 | |
| | DABCO TAC | 1.0 | |
| 16. (653C) | Multranol 3901 | 100. | |
| | Fyrol CEF | 30. | |
| | DOP | 100. | |
| | L5340 | 3.5 | |
| | Isonate 143L | 134.5 | 10. |
| | BzCl | 0.3 | |
| | DABCO TAC | 1.0 | |

Thus having described the invention what is claimed is:

1. A polyurethane product, characterized by a natural absence of polymerization catalyst residue, produced by a one step process consisting essentially of:
   (1) the reaction of
      (a) isocyanate compound selected from the class consisting of aliphatic, aromatic and cycloaliphatic isocyanates having at least two isocyanate groups; and
      (b) diol/polyol compounds having at least two sterically unhindered hydroxyl groups;
      (c) said reactants 1a and 1b being simultaneously present in a stoichiometric excess of said isocyanate groups of about 1-25%;
   (2) in the absence of polymerization catalyst;
   (3)
      (a) said reactants being initially intermingled in the ambient room temperature range of about 65°-86° F.; and
      (b) reacted with intermingling in the absence of externally added heat, for the time needed to obtain a product characterized as homogeneous, non-separating viscous liquid ranging to semiliquid, with adhesive properties.

2. The product of claim 1 wherein said isocyanate compound is toluene diisocyanate.

3. The product of claim 2 wherein said isocyanate compound is a mixture of the 2,4- and 2,6-isomers.

4. The product of claim 1 wherein said isocyanate compound is 4,4'-diphenylmethane diisocyanate.

5. The product of claim 1 wherein said isocyanate compound is hexamethylene diisocyanate.

6. The product of claim 1 wherein said isocyanate compound is methylcyclohexylene diisocyanate.

7. The product of claim 1 wherein said diol/polyol is selected from the class consisting of aliphatic diols, aliphatic polyols, cycloaliphatic diols, cycloaliphatic polyols, aromatic diols and aromatic polyols, having at least two sterically unhindered hydroxyl groups.

8. The product of claim 1 wherein said diol/polyol is poly(oxyethylene) diol having a molecular weight up to about 700.

9. The product of claim 1 wherein said diol/polyol is poly(oxypropylene)diol having a molecular weight up to about 2000.

10. The product of claim 1 wherein said diol/polyol is poly(oxyalkylene)diol adduct of a hydrocarbon polyol having 2-11 hydroxyl groups and alkylene has 2-4 carbon atoms.

11. The product of claim 1 wherein said diol/polyol is poly(oxyalkene) diol adduct of alkylene diamine, which amine-alkylene has at least 2 carbon atoms, which alkylene has 2-4 carbon atoms, and said adduct has at least two terminal hydroxyl groups.

12. The product of claim 11 wherein said alkylene diamine is ethylene diamine.

13. The product of claim 1 where said reaction time is on the order of 2 hours.

14. The product of claim 1 wherein said stoichiometric excess is about 10-20%.

15. The product of claim 1 wherein a plasticizer is present in the reaction zone.

16. The product of claim 1 wherein a fire retardant compound is present in the reaction zone.

17. The product of claim 1 which includes a delayed action cure catalyst, in an amount effective to cure said product.

18. A polyurethane viscous liquid to semiliquid, homogeneous product having adhesive properties prepared to intermingling all the components at ambient room temperature range of about 65°-86° F. and intermingling for a suitable reaction time, without externally added heat, and in the absence of polymerization catalyst, where said components are:
   polyether triol having a molecular weight of about 6000, about 100 parts by weight;
   crude polymeric 4,4'-diphenylmethane diisocyanate having about 2.7 isocyanate groups per molecule, about 90 parts by weight; said isocyanate groups being present in an excess of about 10%;
   benzoyl chloride, about 0.32 parts by weight; and
   low viscosity, high aromatic content oil plasticizer, about 100 parts by weight.

19. A polyurethane viscous liquid to semiliquid, homogeneous product having adhesive properties prepared by intermingling all the components at ambient room temperature range of about 65°-86° F. and intermingling for a suitable reaction time, without externally added heat, and in the absence of polymerization catalyst, where said components are:
   polyether triol of about 700 molecular weight, about 100 parts by weight;
   aromatic polyol, about 6 parts by weight;
   crude polymeric 4,4'-diphenylmethane diisocyanate having about 2.7 isocyanate groups per molecule, about 545 parts by weight; said isocyanate groups being present in an excess of about 20%;
   tris(beta chloroethyl)phosphate fire retardant, about 30 parts by weight; and
   N,N,N',N'-tetrakis(2-hydroxypropyl)ethylene diamine cross linking agent, about 3 parts by weight.

20. A polyurethane viscous liquid to semiliquid, homogeneous product having adhesive properties prepared by intermingling all the components at ambient room tempertaure range of about 65°-86° F. and intermingling for a suitable reaction time, without externally added heat, and in the absence of polymerization catalyst, and including a delayed action cure catalyst in an amount effective to cure said product, where said components are:

polyether triol having a molecular weight of about 6000, about 100 parts by weight;

crude polymeric 4,4'-diphenylmethane diisocyanate having about 2.7 isocyanate groups per molecule, about 119 parts by weight; said isocyanate groups being present in an excess of about 10%;

dioctyl phthalate plasticizer, about 100 parts by weight;

tris(beta chloroethyl)phosphate fire retardant, about 30 parts by weight;

benzoyl chloride, about 0.3 parts by weight;

non-hydrolyzable silicone surfactant, about 3.5 parts by weight; and hydroxyalkyl quaternary ammonium carboxylate delayed action catalyst.

* * * * *